(12) United States Patent
Wagner et al.

(10) Patent No.: US 8,424,398 B2
(45) Date of Patent: Apr. 23, 2013

(54) TIGHT PACKAGE SENSOR SEAL

(75) Inventors: John B. Wagner, Greenfield, IN (US);
Kane A. Myers, Indianapolis, IN (US);
J. Brian Cloud, Greenwood, IN (US)

(73) Assignee: Freudenberg-NOK General Partnership, Plymouth, MI (US)

(*) Notice: Subject to any disclaimer, the term of this patent is extended or adjusted under 35 U.S.C. 154(b) by 336 days.

(21) Appl. No.: 12/860,558

(22) Filed: Aug. 20, 2010

(65) Prior Publication Data

US 2010/0314840 A1 Dec. 16, 2010

Related U.S. Application Data

(62) Division of application No. 11/687,928, filed on Mar. 19, 2007, now Pat. No. 7,798,497.

(51) Int. Cl.
*G01D 11/26* (2006.01)
*F16J 15/02* (2006.01)
(52) U.S. Cl.
USPC .................. 73/866.5; 73/431; 277/634
(58) Field of Classification Search .............. 73/431, 73/866.5; 277/634
See application file for complete search history.

(56) References Cited

U.S. PATENT DOCUMENTS

| | | | |
|---|---|---|---|
| 2,797,944 A | 7/1957 | Riesing | |
| 2,830,858 A | 4/1958 | Moorman et al. | |
| 3,288,067 A * | 11/1966 | Madlener et al. | 102/223 |
| 4,298,206 A | 11/1981 | Kojima et al. | |
| 4,530,506 A | 7/1985 | Weiler et al. | |
| 4,565,380 A | 1/1986 | Newman et al. | |
| 4,874,261 A | 10/1989 | Colanzi et al. | |
| 5,310,408 A | 5/1994 | Schryver et al. | |
| 5,483,994 A * | 1/1996 | Maurer | 138/31 |
| 5,649,709 A | 7/1997 | Munekata et al. | |

(Continued)

FOREIGN PATENT DOCUMENTS

| | | |
|---|---|---|
| EP | 11 004 296.7 A | 12/2011 |
| EP | 11 004 296.7 X | 12/2011 |
| FR | 2678063 A1 * | 12/1992 |

OTHER PUBLICATIONS

Machine translation of description (5 pages) and claims (2 pages) of FR 2678063, patent document dated Dec. 1992, by Patent Translate, powered by EPO and Google, downloaded Jan. 14, 2013 from http://translationportal.epo.org/emtp/translate/?ACTION=description-retrieval&COUNTRY=F . . . and http://translationportal.epo.org/emtp/translate/?ACTION=claims-retri. . .*

*Primary Examiner* — Thomas P Noland
(74) *Attorney, Agent, or Firm* — Daniel J. Sepanik, Esq.; Harness, Dickey & Pierce, P.L.C.

(57) ABSTRACT

A tight package sensor seal includes a first seal portion engaging an outer surface of a sensor body and including a stop surface floatingly engaging a peripheral face surrounding a bore in a cover member. The first seal portion includes a reinforcing insert disposed therein. A second seal portion is axially spaced from the first seal portion and a flexible membrane extends axially between the first and second seal portions. The second seal portion engages an inner diameter of a bore in a cover member and includes a reinforcing insert therein. The sensor seal takes up a small radial space yet allows for radial offset of the sensor body relative to the bore of the cover member.

10 Claims, 1 Drawing Sheet

U.S. PATENT DOCUMENTS

| | | |
|---|---|---|
| 5,730,444 A | 3/1998 | Notter |
| 6,994,354 B2 | 2/2006 | Sakata |
| 8,002,287 B2 * | 8/2011 | Wagner .................. 277/551 |
| 8,256,287 B2 * | 9/2012 | Karmazyn ................ 73/431 |
| 2002/0149154 A1 | 10/2002 | Oldenburg |
| 2003/0160397 A1 | 8/2003 | Sakata |
| 2004/0207530 A1 * | 10/2004 | Nielsen .................. 340/604 |
| 2005/0173869 A1 | 8/2005 | Wagner |
| 2008/0012234 A1 | 1/2008 | Wagner |
| 2008/0231002 A1 | 9/2008 | Wagner et al. |
| 2010/0164186 A1 * | 7/2010 | Dao et al. ............... 277/634 |
| 2012/0186370 A1 * | 7/2012 | Auerswald et al. ........ 73/866.5 |
| 2012/0210786 A1 * | 8/2012 | Steinbrink et al. ......... 73/431 |

* cited by examiner

TIGHT PACKAGE SENSOR SEAL

CROSS-REFERENCE TO RELATED APPLICATIONS

This application is a divisional of U.S. patent application Ser. No. 11/687,928, filed Mar. 19, 2007 (now U.S. Pat. No. 7,798,497). The entire disclosure of the above application is incorporated herein by reference.

FIELD

The present disclosure relates to seals and more particularly, to a tight package sensor seal.

BACKGROUND

The statements in this section merely provide background information related to the present disclosure and may not constitute prior art.

Seals are commonly used for sealing a gap disposed around an outer surface of an inner member received within a bore of an outer member. Typically, the gap is sized so as to fully accommodate the seal member radially between the outer surface of the inner member and the inner surface of the bore. When the gap is very narrow, the tolerances for accommodating offset of the inner member relative to the bore, are very tight. Accordingly, it is desirable in the art to provide a seal arrangement that has a tight package and is capable of accommodating for radial offset of the inner member relative to an outer member.

SUMMARY

A tight package sensor seal includes a first seal portion engaging an outer surface of a sensor body and including a stop surface floatingly engaging a peripheral face surrounding a bore in a cover member. The first seal portion includes a reinforcing insert disposed therein. A second seal portion is axially spaced from the first seal portion and a flexible membrane extends axially between and connects the first and second seal portions. The second seal portion engages an inner diameter of a bore in a cover member and includes a reinforcing insert therein. The sensor seal takes up a small radial space yet allows for radial offset of the sensor body relative to the bore of the cover member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
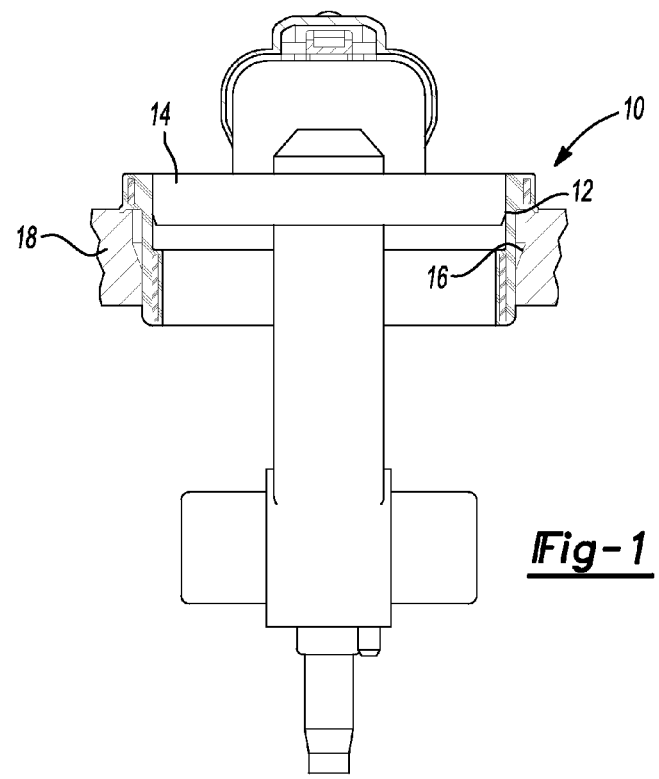
Figure 2:
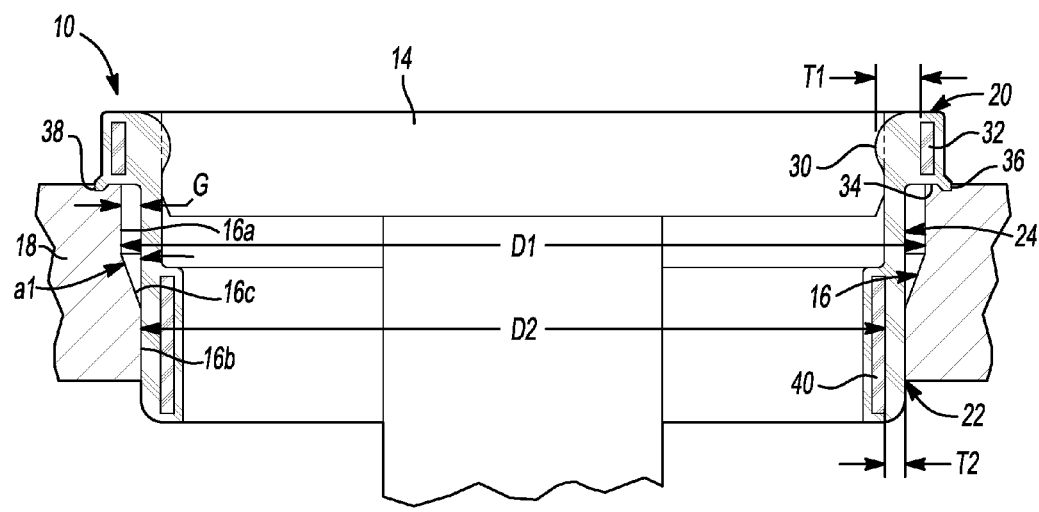

FIG. 1 is a partial cross-sectional view illustrating a tight package seal, according to the principles of the present disclosure, applied to a sensor received in a bore in a cover member; and FIG. 2 is a detailed cross-sectional view of the tight package seal according to the principles of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 and 2, a tight package seal 10 according to the present disclosure will now be described. In FIG. 1, the tight package seal 10 is provided in a sealing engagement between an outer surface 12 of a sensor body 14 and a bore 16 of a cover member 18. Although the seal 10 is described herein with reference to a specific embodiment as a sensor seal, it should be understood that the tight package seal 10 can be used in other applications for sealing between an outer surface of a first member and a bore of a second member wherein a limited radial space is provided therebetween.

With reference to FIG. 2, the tight package seal 10 includes an annular elastomeric seal body having a first seal portion 20 engaging the outer surface 12 of the sensor body 14. A second seal portion 22 is axially spaced from the first seal portion 20 and sealingly engages an inner surface of the bore 16 of the cover member 18. A flexible membrane portion 24 extends generally axially between the first seal portion 20 and the second seal portion 22.

The first seal portion 20 can include a radially inwardly extending raised bead portion 30 and can further include a reinforcing metal insert 32 embedded within the elastomeric material. The first seal portion 20 includes a radially outwardly extending stop surface 34 facing axially toward the second seal portion 22. The stop surface 34 engages a perimeter axial face 36 of the cover member 18. The stop surface 34 can include a dust lip 38 extending therefrom and axially engaging the face 36 of the cover member 18. A thickness T1 of the elastomeric material in the first seal portion 20 can be adjusted to allow for tighter or looser engagement with the outer surface 12 of the sensor body 14.

The bore 16 in the cover member 18 can include a first, outboard, portion 16a having a first diameter D1 and a second, inboard, portion 16b having a second diameter D2 which is smaller than D1. The first diameter D1 is larger than an outer diameter of the flexible membrane portion 24, so as to define a gap G between the flexible membrane portion 24 and the first portion 16a of the bore 16. An intermediate portion 16c of the bore 16 can define a tapered surface extending between the first portion 16a and the second portion 16b. The tapered surface can be provided with an angle a1. The angle a1 can be selected to allow lateral offset of the flexible membrane portion 24 relative to the first portion 16a of the bore 16. An angle a1 of between 10 and 30 degrees is preferred, although other angles can be used.

The second seal portion 22 has an outer diameter slightly larger than the diameter D2 of the second portion 16b of the bore 16 in order to provide a sealing engagement therebetween. The second seal portion can include a reinforcing metal insert 40 therein. A thickness T2 of the elastomeric material in the second seal portion 22 can be adjusted to allow for tighter or looser engagement with the inner surface 16b of the bore 16. Preferably, the thickness T2 is less than the thickness T1 to facilitate firmly holding the seal 10 within the bore 16 when the sensor body is inserted or removed.

The tight package seal 10 provides a sealed relationship between the sensor body 14 and the bore 16 wherein the sealed engagement with the sensor body 14 and the bore 16 are axially offset. The seal 10 also allows the sensor body 14 to be laterally offset relative to the bore 16 at least by the amount of the gap G between the flexible membrane portion 24 and the first portion 16a of the bore 16. The stop surface 34 and dust lip 38 of the first seal portion 20 provide a secondary seal engagement that is able to float radially to accommodate for lateral offset of the sensor body 14 relative to the bore 16.

What is claimed is:

1. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion.

2. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion;
wherein said first seal portion includes a radially outwardly extending stop surface facing axially toward said second seal portion.

3. The sealing arrangement according to claim 2, wherein said radially outwardly extending stop surface includes a dust lip extending therefrom.

4. The sealing arrangement according to claim 2, wherein said radially outwardly extending stop surface engages a perimeter axial face of said cover member surrounding said bore.

5. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion;
wherein said bore includes a first diameter portion adjacent to said flexible membrane portion and a second diameter portion adjacent to said second sealing portion, said first diameter portion being larger than said second diameter portion.

6. The sealing arrangement according to claim 5, wherein said second sealing portion and said flexible membrane portion each have a same outside diameter.

7. The sealing arrangement according to claim 5, wherein said bore includes a tapered surface between said first diameter portion and said second diameter portion.

8. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion;
wherein a gap is provided between said flexible membrane portion and said bore.

9. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion;
wherein said first sealing portion is laterally movable relative to said bore to accommodate for lateral offset of said sensor body relative to said bore in said cover member.

10. A sealing arrangement for a sensor, comprising:
a sensor body having an outer surface;
a cover member defining a bore;
an elastomeric seal body including:
a first seal portion sealingly engaged with said outer surface of said sensor body,
a second seal portion axially spaced from said first seal portion and adapted to sealing engage an inner surface of said bore, and
a flexible membrane portion extending axially between said first seal portion and said second seal portion;
wherein said first seal portion and said second seal portion each include a metal reinforcing insert therein.

* * * * *